US012676466B2

(12) United States Patent
Sander

(10) Patent No.: US 12,676,466 B2
(45) Date of Patent: Jul. 7, 2026

(54) HOLDING DEVICE, COMBINATION OF A HOLDING DEVICE AND AN APPLICATION COMPONENT, ELECTRIC CONNECTION DEVICE, AND ACTUATOR SYSTEM

(71) Applicant: PHYSIK INSTRUMENTE (PI) GMBH & CO. KG, Karlsruhe (DE)

(72) Inventor: Christian Sander, Karlsbad (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 10 days.

(21) Appl. No.: 18/852,411

(22) PCT Filed: Mar. 31, 2023

(86) PCT No.: PCT/EP2023/058513
§ 371 (c)(1),
(2) Date: Sep. 27, 2024

(87) PCT Pub. No.: WO2023/187177
PCT Pub. Date: Oct. 5, 2023

(65) Prior Publication Data
US 2025/0219377 A1 Jul. 3, 2025

(30) Foreign Application Priority Data
Mar. 31, 2022 (DE) ..................... 10 2022 107 697.0

(51) Int. Cl.
*H02G 3/32* (2006.01)
*F16L 3/127* (2006.01)
(52) U.S. Cl.
CPC ................ *H02G 3/32* (2013.01); *F16L 3/127* (2013.01)
(58) Field of Classification Search
CPC ................................... H02G 3/32; F16L 3/127
See application file for complete search history.

(56) References Cited

U.S. PATENT DOCUMENTS

| | | | | |
|---|---|---|---|---|
| 12,326,208 B2 * | 6/2025 | Martin | ..................... | H02G 3/32 |
| 12,372,169 B2 * | 7/2025 | Stone | .................... | F16L 3/1075 |

(Continued)

FOREIGN PATENT DOCUMENTS

| | | |
|---|---|---|
| CN | 110797828 A | 2/2020 |
| DE | 3448084 A1 | 9/1986 |

(Continued)

OTHER PUBLICATIONS

German Written Opinion of the International Searching Authority (18 pages).

(Continued)

*Primary Examiner* — Eret C Mcnichols
(74) *Attorney, Agent, or Firm* — The Juhasz Law Firm

(57) ABSTRACT

Holding device (1) for holding at least one cable (K), comprising the holding device (1):
 a holder housing (10) with a cable-receiving opening (14) for receiving at least one cable (K),
 a connection device (20) which, in a coupling state, couples the holding device (1) to an application component (A), the connection device (20) having a coupling piece (60) made of magnetic material which can be coupled to an application component surface section (A1) of the application component (A), so that, in the coupling state, the holder housing (10) can be rotated relative to the application component (A) at least about the second reference axis (B2),
and a combination of such a holding device (1) and an application component (A), electrical connection device (C) and an actuator system (S) with an actuator (S1) and with a holding device (1).

15 Claims, 3 Drawing Sheets

(56) References Cited

U.S. PATENT DOCUMENTS

Figure 1:
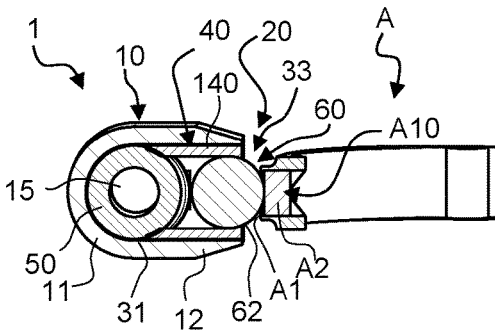

| | | | |
|---|---|---|---|
| 12,455,020 B2 * | 10/2025 | Varale ...................... | H02G 3/32 |
| 2024/0117897 A1 * | 4/2024 | Minder ................ | A61G 7/0503 |
| 2025/0251059 A1 * | 8/2025 | Nepola ................... | F16L 3/237 |

FOREIGN PATENT DOCUMENTS

| | | |
|---|---|---|
| JP | H1127326 A | 1/1999 |
| JP | 2001326021 A | 11/2001 |
| JP | 2007032595 A | 2/2007 |
| JP | 6324052 B2 | 5/2018 |
| WO | 2013/074626 A1 | 5/2013 |
| WO | 2016203224 A1 | 12/2015 |

OTHER PUBLICATIONS

English Translation of German Written Opinion of the International Searching Authority (8 pages).
German EP German Examination report (5 pages).
Japanese Notice of Reasons for Rejection (2 pages).
English Translation of Notice of Reasons for Rejection (2 pages).

* cited by examiner

HOLDING DEVICE, COMBINATION OF A HOLDING DEVICE AND AN APPLICATION COMPONENT, ELECTRIC CONNECTION DEVICE, AND ACTUATOR SYSTEM

The invention relates to a holding device, a combination of a holding device and an application component, an electrical connection device and an actuator system with an actuator and with a holding device.

In the general state of the art, cable ties are known which are attached to a section on a magnet so that the magnet can be fixed to a surface of an application component with the cable tie to hold a cable.

The object of the invention is to provide a holding device, a combination of a holding device and an application component, an electrical connection device and an actuator system, each of which are alternative solutions to known such devices. In particular, it should be possible to hold a cable, in particular an electrical cable, on the holding device, on the combination of a holding device and an application component, on the electrical connection device and on the actuator system in an efficient manner that permits degrees of freedom of movement and mobility or movements of the cable.

According to the invention, a holding device for holding at least one cable is provided. According to one embodiment, the holding device comprises:

a holder housing which comprises a cable-receiving opening, in particular in the form of a through opening, which extends along a first reference axis of the holding device and which serves to receive at least one cable, a connection device which, in a coupling state, couples the holding device to an application component, the holder housing and the connection device being located one behind the other in a second reference axis of the holding device, wherein the connection device comprises a coupling piece made of magnetic and in particular ferromagnetic or magnetizable material, which can be detachably coupled to an application component surface section of the application component, and in the coupling state the holder housing can be rotated relative to the application component at least about the second reference axis.

Preferably, the holding device according to the invention is realized in such a way that a surface section of the coupling piece at least partially forms an outer surface of the holding device, and that the coupling piece comprises, at least in a section, a curved surface section whose orientation runs along the second reference axis and which projects away from the cable-receiving opening.

The term "detachably couplable" between two components or sections of two components, such as in particular between the coupling piece made of magnetic or magnetizable material and the application component in or on the application component surface section, is understood herein to mean in particular a coupling of the two components or sections due to a magnetic attraction force. For this purpose, the application component is formed or manufactured from magnetic or magnetizable material in the area of the application component surface section.

In each of the embodiments of the holding device according to the invention with otherwise each combination of features of the holding device described herein, the holding device can be realized in such a way that in the coupling state it is additionally displaceable along the extension of the application component surface section, so that the holding device and, if applicable, the holding device together with at least one cable received by the holder housing can be moved along or transversely or both along and transversely to the first reference direction.

In each of the embodiments of the holding device according to the invention with otherwise each combination of features of the holding device described herein, the holding device can be realized in such a way that the holder housing can be tilted relative to the application component surface section in the coupling state, optionally with a cable received by the holder housing.

In the coupling state, the holding device can be rotatable relative to the application component surface section with a rotational movement component that comprises an axis of rotation that runs perpendicular to the second reference axis.

In each of the embodiments of the holding device according to the invention with otherwise each combination of features of the holding device described herein, the holding device can be realized in such a way that the coupling piece comprises, at least in a section, a convexly curved and in particular a spherical surface section, the orientation of which extends along the second reference axis and which projects away from the cable-receiving opening or the through opening. Thus, the convex or spherical curvature is shaped in a viewing direction as seen from the application component. In particular, the convex curvature may be formed in an area that is the furthest area or contains the furthest point of the surface portion as viewed from the holder housing. This area can also be an area surrounding the furthest point of the surface section. Thus, in this case, the directions of the surface normals of the curved surface section run along the second reference axis and are directed away from the through opening. In this case, the coupling piece projects outwards away from the holder housing.

In each of the embodiments of the holding device according to the invention with otherwise each combination of features described herein, the holding device can be realized in such a way that the coupling piece is designed at least in a section as a cylindrical body, wherein a planar base surface of the cylindrical body comprises an orientation which is directed in or along the direction of the second reference axis and is directed away from the through opening.

In each of the embodiments of the holding device according to the invention with otherwise each combination of features described herein, the holding device can be realized in such a way that outwardly projecting portion of the coupling piece comprises the shape of a cylindrical outer surface at least in a section, wherein the orientations of the cylindrical outer surface are directed along the direction of the second reference axis and away from the through opening.

In each of the embodiments of the holding device according to the invention with otherwise each combination of features of the holding device described herein, the holding device can be realized in such a way that the connection device comprises an adapter part which is inserted into an opening of the holder housing, which is directed away from the through opening in the direction of the second reference axis or whose edge line defining the through opening runs around the second reference axis, wherein by means of the adapter part the coupling piece is held in the holder housing. In particular, it may be provided that the coupling piece is fixed or fastened in the holder housing.

In particular, it may be provided that the adapter part is shaped in such a way that it forms a positive-fitting connection with the coupling piece. Alternatively or additionally, it can be provided that the adapter part is completely located in the holder housing or that a section of the adapter part protrudes from the holder housing.

In embodiments of the holding device with an adapter part, this can be screwed into an opening in the holder housing.

In each of the embodiments of the holding device according to the invention with otherwise each combination of features of the holding device described herein, the holding device can be realized in such a way that the cable-receiving opening is realized in particular as a through opening which is designed in such a way that a cable inserted therein can move relative to the holder housing in the first reference axis or can perform a rotation about the first reference axis. This is possible in particular if there is sufficient play between the inside of the through opening and the section of the at least one cable located in the through opening.

In each of the embodiments of the holding device according to the invention with otherwise each combination of features of the holding device described herein, the holding device can be realized in such a way that a cable-receiving part for receiving a respective section of the at least one cable is arranged in the cable-receiving opening or the through opening of the holder housing. It may be provided that the cable-receiving part is realized as a hollow cylindrical receiving element which extends along the first reference axis of the holding device.

According to a further aspect of the invention, a combination of a holding device according to the invention and an application component is provided, wherein, in a coupling state, the coupling piece and the application component are coupled or attracted to one another by a magnetic force in an application component surface section against which the holding device rests. In particular, the application component surface section can be designed as a concave recess in which the coupling piece is partially located.

In the embodiments of the combination of a holding device according to the invention and an application component according to the invention, it may be provided that the application component surface portion of the application component comprises a convexly curved outer surface. In particular, the application component may comprise a pin-shaped portion with a convexly curved outer surface, which is the application component surface portion, wherein the pin-shaped portion abuts against which the coupling piece.

The aforementioned combination of a holding device according to the invention and an application component can generally be realized in such a way that the application component is designed as a crimp flange.

According to a further aspect of the invention, an electrical connection device for electrically connecting a cable to a contacting device is provided with an embodiment of the holding device according to the invention and an application component which is designed as an electrical contacting device made of an electrically conductive material, whereby the coupling piece is made of electrically conductive material, wherein, in a coupling state, the coupling piece abuts against an application component surface portion of the application component, and the coupling piece of the holding device and the application component (A) are attracted by a magnetic attraction force and are coupled, wherein the coupling piece abuts against an application component surface portion of the electrical contacting device, and the holding device and the application component are attracted and coupled by a magnetic attraction force.

According to another aspect of the invention, there is provided an actuator system comprising an actuator and a holding device according to an embodiment described herein, wherein the actuator comprises a pin-shaped contacting member comprising a convexly curved outer surface portion which is an application component surface portion against which the coupling piece abuts in the coupling state.

The term "along" herein means, in connection with a directional indication mentioned herein, which may in particular also relate to the course of a contour line or a surface or a direction of a component or a structural component such as an axis or a shaft or a central axis thereof, in relation to a reference direction or a reference axis, that a section of the course or the tangent to a respective contour line or respective surface or the direction in an explicitly or implicitly predetermined viewing direction deviates locally or in a section at an angle of at most 45 degrees and in particular at most 30 degrees from the respective reference direction or reference axis to which the respective directional indication is related.

The term "transverse" means herein in connection with a directional indication mentioned herein, which may in particular also relate to the course of a contour line or a surface or a direction of a component or a structural component such as an axis or a shaft or a central axis thereof, with respect to a reference direction or a reference axis, that a section of the course or the tangent to a respective contour line or respective surface or the direction in an explicitly or implicitly predetermined viewing direction deviates locally or in a section with an angle which is between 45 degrees and 135 degrees, and preferably with an angle which is between 67 degrees and 113 degrees, from the respective reference direction or reference axis to which the respective directional indication is related.

The term "distance", in particular between two surfaces, is understood herein to mean in particular the shortest distance.

More specifically, a "distance", in particular between two objects or two surfaces or reference points, may be understood herein to mean, in particular, the shortest distance or the shortest distance between the two objects or surfaces or reference points, the shortest distance or the shortest distance being non-zero in amount, unless explicitly stated otherwise herein in this respect.

A "center line" or a "longitudinal direction" or "reference axis" or another reference line, such as in particular a central axis or a centrally extending line of at least one structural component or a structural part, which in each case can be in particular a meander section, can be defined herein in such a way that it results in particular as a connecting line of the centers of gravity of the respective smallest cross-sectional areas of the respective structural component at each point along a determined or predetermined reference line or a course between two determined or predetermined ends of the structural component or the structural part. However, a "center line" of a reference line herein can also extend according to another definition known from the prior art. In case that the reference line can be curved or at least partially curved, a reference direction at a point on the reference line can generally be understood as a local longitudinal direction and in particular have the direction of the tangent to this point.

The term "substantially" in relation to a feature or value is understood herein in particular to mean that the feature contains a deviation of 20% and especially of 10% from the feature or its geometric property or value.

In this context, "orientation" in relation to a surface and in particular a surface is understood to mean the normal to the respective surface. In case that the surface in question is not a straight surface but, for example, a curved surface, the normal to a straight surface of the same size can be used to determine the surface normal, the position of which results in the smallest deviation relative to the curved surface.

An "extension" of a surface portion is understood to be a direction of a planar surface portion which runs along the referenced surface portion and comprises a position relative to the referenced surface portion such that the sum of the deviation amounts between the two surface portions is minimal. With reference to a length amount of the extension of a surface section, a length of a fictitious surface section of the same size in a direction to be defined is understood herein, which comprises a position relative to the referenced surface section in which the sum of the deviation amounts between the two surface sections is minimal.

In this context, "planar" in relation to a surface section means that the surface section can be either straight or curved.

A ruled surface section is understood herein to be a surface section and in particular an outer surface section, which is designed as a ruled surface, i.e. a surface that can be generated by moving a straight line in space, and is understood herein to be a surface and in particular an outer surface.

A "cylindrical component" or a "cylindrical section" of a component is understood herein to be a component or section thereof which comprises the shape of a section of the lateral surface of a general cylinder, at least in a section.

A "cylindrical outer surface" is understood herein as an outer surface that can be unrolled into the plane without distortion as a ruled surface Convexly curved outer surface section is a section of a convex outer surface that comprises a continuous and differentiable course in any direction. A convexly curved outer surface section may in particular be convexly and spherically curved. The term "convex" herein means convex in the viewing direction from outside the holding device onto the respective outer surface, i.e. in particular as seen from the application component surface section in the coupling state.

In this context, "magnetic material" means in particular a material that either comprises intrinsic magnetic properties (such as a permanent magnet) or can be magnetized with the aid of a magnet (such as a ferromagnetic material like iron or steel).

The object of the invention is to provide a cable holder which is an alternative to known cable holders.

Figure 2:
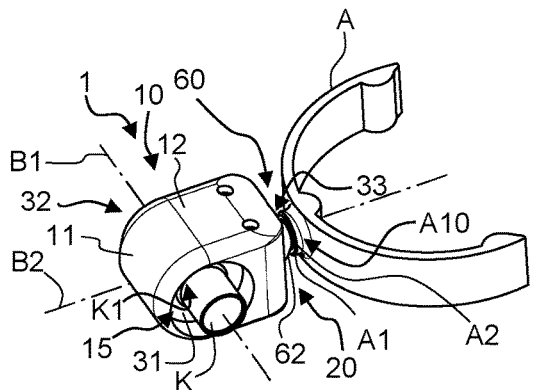
Figure 3:
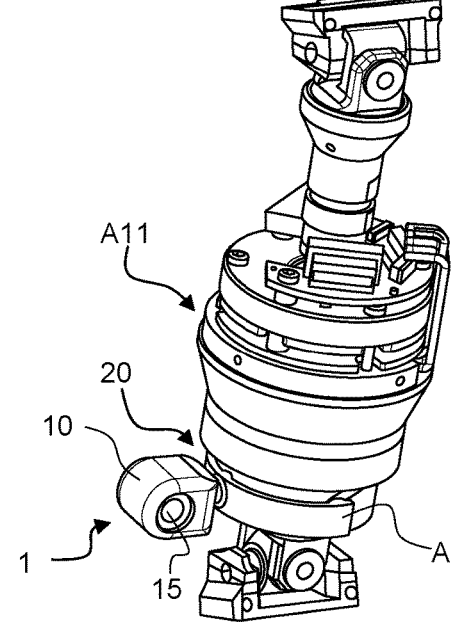
Figure 4:
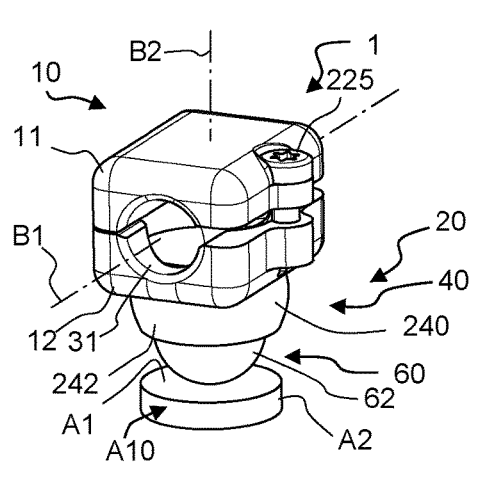
Figure 5:
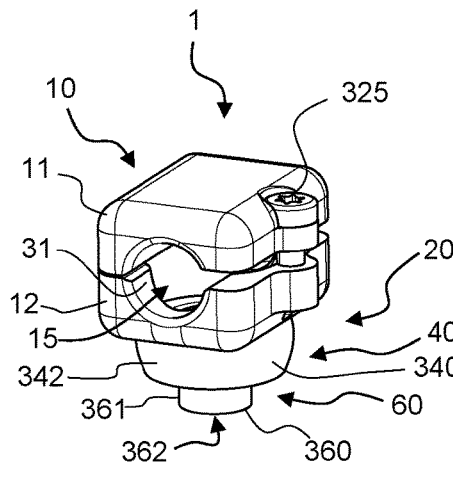
Figure 6:
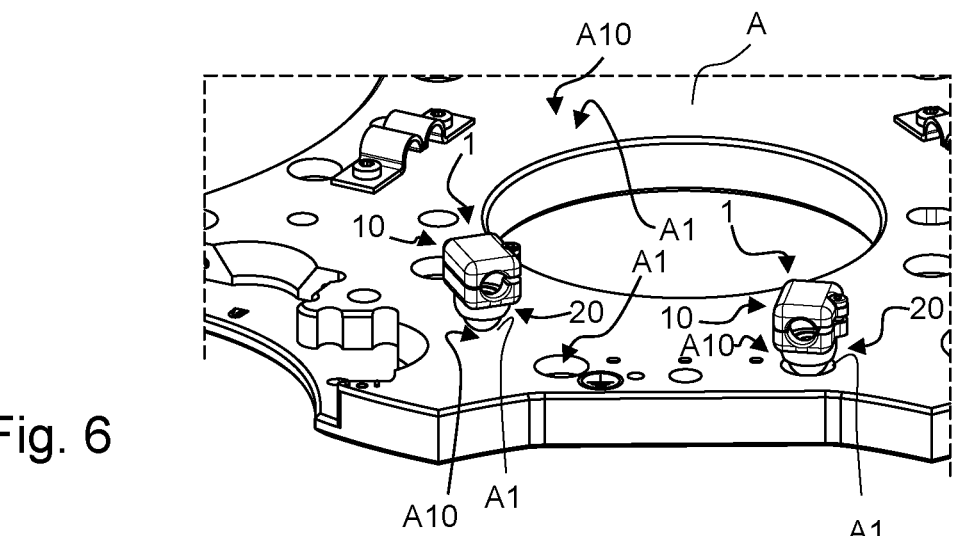
Figure 7:
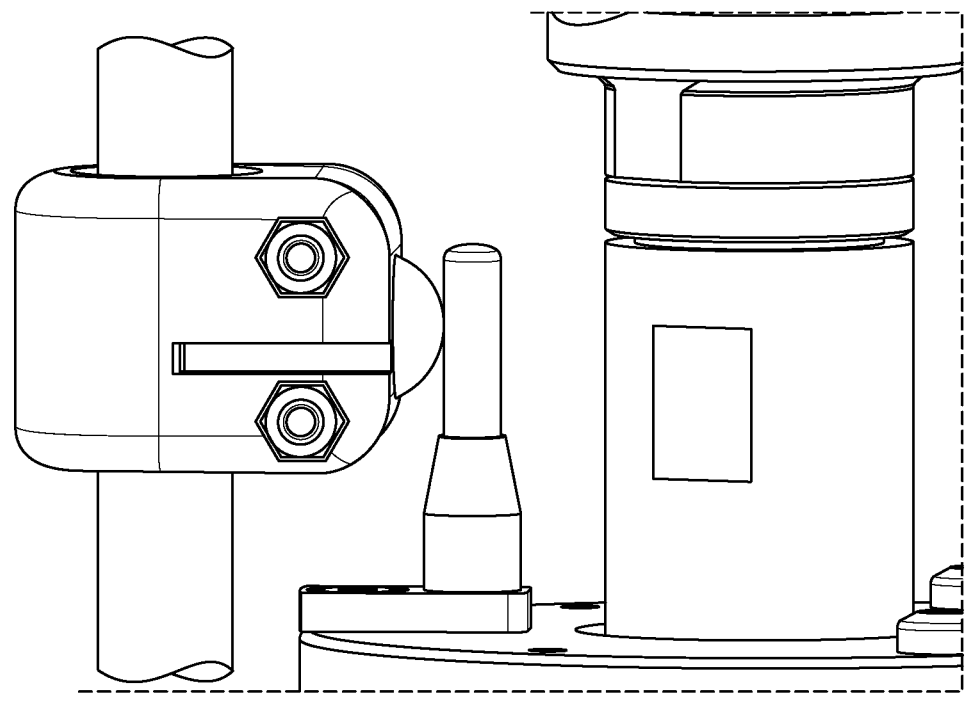
Figure 8:
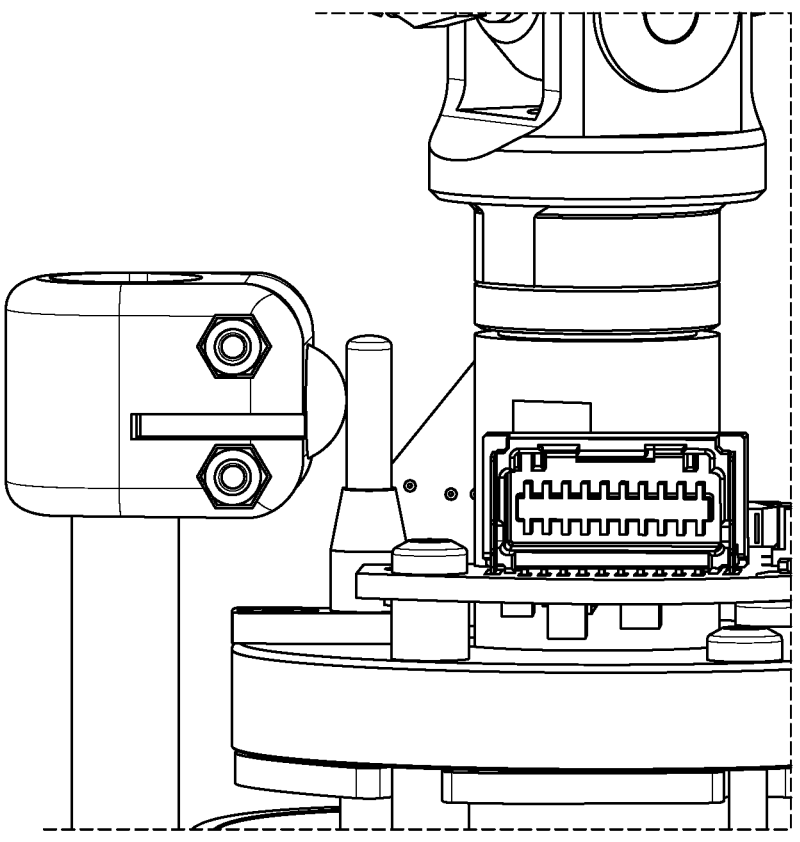

In the following, embodiments of the invention are described with reference to the accompanying figures. Herein, the description of features or components of embodiments according to the invention is to be understood as meaning that a respective embodiment according to the invention, unless this is explicitly excluded, may also comprise at least one feature of another embodiment, in each case as an additional feature of this respective embodiment or as an alternative feature replacing another feature of this respective embodiment. The figures show:

FIG. 1 a side view of an embodiment of the cable holder according to the invention, FIG. 2 a perspective view of the embodiment of the cable holder shown in FIG. 1, FIG. 3 a perspective view of an actuator to which the cable holder shown in FIG. 1 is attached, FIG. 4 a perspective view of a further embodiment of the cable holder according to the invention, FIG. 5 a perspective view of a further embodiment of the cable holder according to the invention, FIG. 6 a perspective view of a section of a further embodiment of an application component with two examples of the embodiment of the cable holder according to FIG. 4, each of which is arranged on the surface of the section, FIG. 7 a perspective view of a further embodiment of the application component in the form of a contacting device, which is designed as a pin-shaped contacting part, and the embodiment of the cable holder according to FIG. 4, which is arranged in each case on the surface of the pin-shaped connection part, wherein the pin-shaped connection part is attached to a further application component, and FIG. 8 a perspective view of an electrical connection device according to the invention, wherein the electrical connection device is an embodiment of the cable holder according to FIG. 4 and the embodiment of the application component is an electrical contacting device in the form of a pin-shaped connection part according to FIG. 7.

The holding device 1 according to the invention is intended for holding or fixing at least one cable K and in particular a section of the at least one cable K and for this purpose for arrangement or attachment to a section or area of an application component A. The application component A can be any application component with an electrical power supply or an electrical control or both an electrical power supply and an electrical control. Accordingly, the at least one cable K can be a power cable or a cable for controlling an application component A or a signal cable. The application component A can also be an actuator or a motor or a computer component or a housing of an actuator or a housing of a motor or a housing of a computer component. The application component A can also be an intermediate holder or an intermediate piece, which is intended for attachment to fixtures or a wall, i.e. to a spatially fixed or fastened or fixed object. The application component A can also be a separate, spatially installable component.

The holding device 1 shown in FIG. 1 comprises: a holder housing 10 with a cable-receiving opening 14, which, as shown in the figures, can be realized in particular as a through opening 15 or as a recess, and a connection device 20 for coupling the holding device to the application component A in the form of a crimp flange. In order to describe the holding device 1 and components thereof, a first reference axis B1 and a second reference axis B2, which runs perpendicular to the first reference axis B1, are defined herein. In the following, the cable-receiving opening 14 is described as a through opening 15. The first reference axis B1 runs centrally through the cable-receiving opening 14 or through opening 15, so that the through opening 15 extends along the first reference axis B1 of the holding device 1.

The cable-receiving opening 14 realized as a recess is designed to receive at least one end section of a cable K. The through opening 15 is designed to accommodate at least one cable K. The at least one cable K can be designed as a single cable or as a plurality of cables or as a cable bundle. In case that at least one cable K is accommodated by the through opening 15, the same extends through the through opening 15, so that a cable accommodating section K1 is located within the through opening 15. The cross-section of the through opening 15 is designed in terms of its size and shape in the direction of the first reference axis B1 such that the cable-receiving section K1 can be accommodated in the through opening 15. In particular, the size and shape of the through opening 15 can be designed in such a way that there is sufficient clearance between the inner surface of the through opening 15 and the outer surface of the at least one cable K. The size and shape of the through opening 15 can be designed in such a way that the at least one cable K can move relative to the holder housing 10 along the first reference axis B1 and can rotate about the first reference axis B1. The size of the smallest diameter of the through opening 15 in the direction of the first reference axis B1 can be decisive here.

The connection device 20 comprises a coupling piece 60, which is formed from a magnetic material. The coupling piece 60 is held in the holder housing 10 and is preferably attached and fixed therein or thereto. The coupling piece 60 is provided for coupling to an application component surface section A1 of the application component A. For this purpose, as is also realized in the embodiment of FIG. 1, the coupling piece 60 may be located only partially in the holder housing 10 and a second portion of the coupling piece 60 may protrude from the holder housing 10, so that at least a portion of a surface portion 62 of the coupling piece 60 forms a protruding outer surface of the holding device 1, so that the coupling piece 60 partially protrudes from the holder housing 10. Alternatively, the holding device 1 can be realized in such a way that the coupling piece 60 is completely located in the holder housing 10, i.e. does not form a protruding outer surface of the holding device 1. The surface section 62 is spherically curved. In general, in these embodiments, the protruding surface section 62 can be convexly curved in at least one section. The shape of the coupling piece 60 can otherwise be arbitrary and is in particular advantageously adapted to the holder housing 10 or the respective adapter part 40.

In this case, the convex or, in particular, spherical curvature is formed in a viewing direction as seen from the application component. The convex curvature of the surface portion 62 is formed in particular in an area that is the most distant area as seen from the holder housing 10 or contains the most distant point of the surface portion. This region can also be a surrounding region of the furthest point of the surface section.

In particular, the second reference axis B2 can be defined in such a way that it intersects the first reference axis B1 and additionally runs through the center or the central point of the coupling piece 60. The second reference axis B2 can also be defined in another way. For example, the second reference axis B2 can be defined such that it intersects the first reference axis B1 and additionally, in a predetermined initial orientation or target orientation of the holding device 1 in the coupling state, forms a vertical to the application component surface section A1, which can in particular be shaped to comprise a straight surface or can be selected such that it comprises a straight surface.

The coupling of the holder housing 10 or the coupling piece 60 to the surface section A1 of the application component A takes place in that the application component A in the region of the application component surface section A1 can be attracted by the magnetic coupling piece 60 and, in particular, is ferromagnetic or metallic, so that, at a suitable distance between the application component surface section A1 and the surface section 62 of the coupling piece 60, which is located facing the application component surface section A1, a magnetic force acts between the coupling piece 60 and the application component surface portion A1 with a force of attraction acting mutually between the coupling piece 60 and the application component A. The selection of the material of the coupling piece 60 and the shape of the coupling piece 60 and the position of the coupling piece 60 in the holder housing 10, which determines the distance of the coupling piece 60 from the application component surface portion A1 in the coupling state, is provided such that, when certain materials of the application component A are used, a magnetic force occurs in the coupling state acts on the application component surface portion A1, which exceeds a predetermined minimum amount, and optionally falls below a predetermined maximum amount, so that on the one hand a sufficient holding force is provided during normal use, and on the other hand the holding force is limited, so that in the event of excessive force acting on the cable K, a desired detachment of the coupling piece 60 from the application component A or its surface section A1 is provided.

In the coupling state, the surface portion 62 of the coupling piece 60 preferably abuts and contacts the application component surface portion A1. In this case, a section of the coupling piece 60 extends in the direction of the second reference axis B2 beyond the holder housing 10 and away from the through opening 15. In contrast, in the case where the coupling piece 60 is located completely within the holder housing 10, a predetermined distance is provided between the surface portion 62 of the coupling piece 60, i.e. each point thereof, and the application component surface portion A1 in the coupling state.

Due to the type of coupling described, the holder housing 10 is rotatable relative to the application component surface section A1 about the second reference axis B2 in the coupling state if a corresponding torque is exerted on the holder housing 10 or the at least one cable K, which causes a rotation about the second reference axis B2 or comprises a component that causes a rotation about the second reference axis B2, whereby in each case the coupling state is simultaneously maintained stable by the magnetic attraction force.

With a corresponding selection of the material of the coupling piece 60, the shape of the coupling piece 60 and the position of the coupling piece 60 in the holder housing 10, a magnetic force occurring in the coupling state can be adjusted, at which the at least one cable K accommodated in the holder housing 10 can be moved with the holding device 1 along or transversely or both along and transversely to the first reference axis B1.

The embodiment of the holding device 1 according to FIG. 1 comprises a coupling piece 60, which is realized as a ball. According to the invention, the coupling piece 60 can also have other shapes in each embodiment of the holding device 1 defined herein. The coupling piece 60 can also be realized as an ellipsoid or in a section as an ellipsoid. In particular, the shape of the coupling piece 60 may be selected in various ways, for example according to application or manufacturing aspects, wherein the coupling piece 60 comprises, at least in a section, a spherical surface section whose orientation extends along the second reference axis B2 and projects away from the through opening 15, i.e. is located facing the application component surface section A1 in the coupling state or is oriented towards it.

Other shapes are also conceivable for the coupling piece 60 in the embodiments of the holding device 1 described herein, which are advantageous for the individual case and for producing a required movability of the holding device 1 in the coupled state, such as, for example, a pyramidal shape at least in a section or a cuboid shape at least in a section or a rhombic shape at least in a section, in each case in a regular or irregular manner.

The spherical surface section can be designed in such a way that the holding device can perform rotations relative to the application component surface section A1 in the coupling state, which comprise different rotational movement components to one another, which in each case run perpendicular to the second reference axis B2 and transverse to one another or perpendicular to one another.

Embodiments of the holding device 1 according to the invention may comprise a coupling piece 60 which is formed at least in a section as a cylindrical body 360, wherein a planar base surface 362 of the cylindrical body 360 comprises an orientation which is directed in or along the direction of the second reference axis B2 and directed away from the through opening 15, i.e. facing the application component surface portion A1 in the coupling state. In particular, it may be provided that a section 361 of the cylindrical body 360 extends beyond the holder housing 10 in the direction of the second reference axis B2. Such a embodiment of the holding device 1 is shown in FIG. 6. Another embodiment of the holding device 1 comprises a coupling piece 60, which is realized at least in a section as a cylindrical body 360 and is located completely in the holder housing 10.

Another embodiment of the holding device 1 comprises a coupling piece 60 which is realized at least in a section as a cylindrical body or partially cylindrical body, wherein a section of the coupling piece 60 projects beyond the holder housing 10 in the direction of the second reference axis B2 and wherein the surface directed away from the holder housing 10 and outwards in the direction of the second reference axis B2 is at least a section of the lateral surface of the coupling piece 60. In this case, the holding device in the coupling state is rotatable relative to the application component surface portion A1 with a rotational movement component which comprises an axis of rotation which extends perpendicular to the second reference axis B2 and, in particular, in or along a reference axis of the coupling piece 60 which is encircled by a portion of the lateral surface of the coupling piece 60 partially.

According to the invention, the coupling piece 60 can be received directly by the holder housing 10, i.e. it can rest against an inner surface or against several inner surfaces of the holder housing 10.

The holder housing 10 can be designed in various ways and generally comprises a first receiving section 11, in which the through opening 15 is formed, and a second receiving section 12, in which the coupling piece 60 is received. The first receiving section 11 and the second receiving section 11 are arranged one behind the other along the second reference axis B2. In particular, the holder housing 10 may be formed as a substantially closed housing having lateral openings 31, 32 formed by the outer edges of the through opening 15, wherein the lateral openings 31, 32 are spaced apart in the direction of the first reference axis B1. In addition, as shown in the embodiment of FIGS. 1 and 2, the holder housing 10 can comprise an opening 33 opening in the direction of the second reference axis B2, which is formed in the second receiving section 12. The holder housing 10 may, but need not, be designed as a hollow body, as shown in FIG. 1, 4 or 5. Alternatively, the first receiving section 11 and the second receiving section 12 can each be realized in the form of a bracket or clamp.

According to one embodiment of the invention, the holder housing 10 can be designed as a closed housing, apart from the opening 33 and the through opening 15. The term "closed housing" implies that the housing or its side walls are made of a continuously passing material or are formed, with regard to the circumferential contour, as walls extending over a surface, which can thus be formed not from a continuously passing material but, for example, from a grid or the like.

The first receiving section 11 and the second receiving section 11 can be manufactured from one piece or as one piece, as shown in the embodiment of the holding device 1 of FIGS. 1 and 2. The first receiving section 11 and the second receiving section 11 can also be manufactured as two separate parts, as shown in the embodiment of the holding device 1 of FIG. 4 and the embodiment of the holding device 1 of FIG. 5. In this case, the two parts can be attached to one another in a form-fitting manner or by means of a connecting element 225 or 325 or, alternatively, by means of several connecting elements.

In the through opening 15, which is located in the first receiving section 11, a cable-receiving part 50 can be arranged, which allows a cable section to be held or guided. The cable receiving part 50, as shown in the embodiment of the holding device 1 of FIG. 1, can be formed in the shape of a sleeve or tube. The cable-receiving part 50 can also be shaped differently, for example as a ring, which con be attached to the through opening 15 inside the through opening 15 and in particular be attached to the first receiving section 11.

The connection device 20 of the embodiments of the holding device 1 according to the invention can comprise an adapter part 40 which is fixed or fastened to the second receiving section 12 of the holder housing 10, e.g. an outer surface, an edge surface or an inner surface thereof, and on which the coupling piece 60 is held or fixed. In general, the coupling piece 60 can be held or fixed in a positive fitting manner in an adapter part 40 provided according to the invention, for example by a corresponding recess in an inner wall of the adapter part 40, in which a section of the coupling piece 60 is located. Alternatively or additionally, the coupling piece 60 can be pressed into the adapter part 40 in order to fix the coupling piece 60 in the adapter part 40.

The embodiment of the holding device 1 according to FIG. 1 comprises an adapter part 40, which is located in the area of the second receiving section 12 and has the shape of a sleeve section and is referred to herein as adapter-receiving sleeve 140. On the inner wall of the adapter-receiving sleeve 140 the coupling piece 60 is located and fixed. Its central axis runs in or along the second reference axis B2. In the figures, the coupling piece 60 is spherical in shape, but it can also have any other shape and in particular any other shape described herein. The adapter-receiving sleeve 140 of the embodiment of the holding device 1 according to FIG. 1 is inserted into the holder housing 10 until an end section of the adapter-receiving sleeve 140 is in contact with the cable-receiving part 50.

In particular, the coupling piece 60 may be realized with any shape comprising, at least in a section, a curved surface portion 62 whose orientation extends along the second reference axis B2 and which projects away from the cable-receiving opening 14 and beyond the opening 33, or its outer boundary edge in this respect, as seen from the cable-receiving opening 14.

The holding device 1 can also be realized in such a way that the adapter part 40, which can be realized in a cylindrical shape, for example, is realized at the opening 33 with a base, i.e. closed, so that the coupling piece 60 does not protrude beyond the holder housing 10 and is also covered on the outside. Alternatively, the holder housing 10 can be closed at this point instead of the opening 33, i.e. comprise a cover for the coupling piece 60, and the holder housing 10 can otherwise be realized according to one of the embodiments described herein. In these cases, the material of the section of the adapter part 40, which covers the coupling piece 60 on the outside, or the material of the holder housing 10 is realized in such a way that the magnetic force caused by the coupling piece 60 acts through this covering section.

The embodiment of the holding device 1 according to FIG. 4 comprises an adapter part 40, which is located in the region of the second receiving section 12 and is attached to the holder housing 10 and comprises the shape of a ring and is referred to herein as adapter-receiving ring 240. Only a section of the receiving ring 240 is inserted into the holder housing 10 at the opening 33 and screwed into it, for example by means of at least one corresponding thread, so that a second section 242 protrudes from the holder housing 10. The coupling piece 60 is attached to the adapter mounting ring 240. To illustrate a possible application of the holder housing 10 according to the invention, a magnet A2 is shown in FIG. 4, which can be attached to an application component A.

Also in this embodiment, the coupling piece 60 generally comprises, at least in a section, a curved surface portion 62, the orientation of which extends along the second reference axis B2 and which projects away from the cable-receiving opening 14 and beyond the opening 33, or its outer boundary edge in this respect, as seen from the cable-receiving opening 14. Here, the convex or, in particular, spherical curvature is shaped in a viewing direction as seen from the application component. The convex curvature of the surface portion 62 is formed in particular in an area that is the most distant area as seen from the holder housing 10 or contains the most distant point of the surface portion. This region can also be a surrounding region of the furthest point of the surface portion.

FIG. 6 shows two coupling states between a holding device 1 as shown in FIG. 4 and an application component A, which is realized in the form of a plate. Several application component surface sections A1 are formed on a surface of the application component A, each in the form of a concave and spherical recess. Independently of these, each straight surface section of the application component A can also be an application component surface section A1. An application component surface section A1 could also be realized as a convexly curved surface section and in particular as a lateral surface of a cylindrical or partially cylindrical shaping or as an edge line, for example of a partially rhombic shaping of an application component A in each case.

The embodiment of the holding device 1 according to FIG. 5 also comprises an adapter part 40, which is located in the region of the second receiving section 12 and is attached to the holder housing 10 and comprises the shape of a ring and is referred to herein as adapter-receiving ring 340. Only a section of the adapter-receiving ring 340 is inserted into the holder housing 10 at the opening 33 and screwed into the latter, for example by means of at least one corresponding thread, so that a second section 342 protrudes from the holder housing 10. The coupling piece 60 is attached to the adapter-receiving ring 340, which is cylindrically shaped in this embodiment of the holding device 1.

FIG. 1 shows a combination of the holding device 1 and an application component A, which is designed as an intermediate piece in the form of a crimp flange. The crimp flange is designed as a bracket or clamp and comprises a coupling part A10 in a central section. The coupling part A10 is made of a magnetic material such as a suitable steel. The coupling part A10 is realized as a cylindrical part, with a flat round surface facing the coupling piece 60 in the coupling state. The coupling part A1 can be omitted, in particular if at least the central section is formed from a magnetic material.

The crimp flange can be attached as an intermediate piece to a section of a further application component A11, in that the crimp flange can be attached to the outside of the further application component A11 and clamped on, for example.

FIG. 3 shows a crimp flange as application component A1 and an actuator as a further application component A11, whereby the crimp flange is clamped to the outside of a cylindrical outer surface section of the further application component A11 and thus fixed.

FIG. 7 shows a perspective view of a combination of a further embodiment of the application component A in the form of a contacting device 500 with a pin-shaped contacting part 501 and the embodiment of the cable holder 1 according to FIG. 1. The contacting device 500 comprises generally a convexly curved outer surface section 501a and in particular the pin-shaped contacting part 501 and a fixing device 502, with which the contacting device 500 is fixed to a further application component A11. The fixing device 502 is provided for fixing the contacting device 500 to a further application component A11 and can, as shown as an example in FIG. 7, in particular comprise a fastening part 505 and a connecting section 507, which connects the fastening part 505 and the pin-shaped contacting part 501 to one another. The contacting device 500 can also be realized without a connecting section 507. In the embodiment shown, the fastening part 505 is exemplarily designed as a plate. In this case, the fastening part 505 can be fastened to a further application component A11. In this case, the fastening part 505 can be fastened to the further application component A11, for example by means of connecting elements or by other types of fastening. The fastening part 505 can also be pin-shaped or rod-shaped or realized as a form-fit part, so that the fastening part 505 can be positively inserted into a correspondingly shaped recess of the further application component A11 and fixed to it.

In the embodiment shown, the further application component A11 is an adjustment device and in particular a telescopically extendable adjustment device. The further application component A11 can comprise an attachment surface A12.

The contacting device 500 can also be realized in another way. This preferably comprises a convexly curved application component surface portion A1. In particular, the application component A may be formed as a straight pin or a pin-shaped contacting member 501 or a contacting member 501 comprising a pin-shaped portion. In this case, the application component surface portion A1 is realized by a convexly curved outer surface portion 501a in the form of a cylindrical shell surface. Also, the contacting portion 501 may be realized as a curved pin. In these cases, it may be provided that only an outer surface section of the contacting part 501 comprises a convexly curved surface section. The contacting part 501 need not be realized in the form of a pin or with a pin-shaped section. Depending on the application, the contacting part 501 can also be realized differently, for example at least in a section as a plate or as an ellipsoidal or spherical body or as a section of such a respective body, in order to provide a convexly curved application component surface section A1.

By providing a convexly curved application component surface section A1 of an application component A, the coupling of a holding device 1 according to an embodiment according to the invention can take place with a predetermined orientation in space or relative to the orientation of the application component A and, in addition, degrees of freedom of movement and rotation or degrees of freedom of movement or degrees of freedom of rotation can be provided in the coupling state. These degrees of freedom provided depend in particular on the shape of the coupling piece 60 of the respective embodiment of the holding device 1 according to the invention and the shape of the convexly curved application component surface section A1. A predetermined orientation of the holding device 1 relative to the contacting device 500 or to the application component surface portion A1 in the coupling state can also be achieved when coupling the holding device 1 to the contacting part 501.

In these implementations, the holding device 1 can be realized according to one of the embodiments or variants thereof described herein.

According to a further aspect of the invention, an electrical connection device C is provided.

An embodiment thereof is shown in FIG. 8. FIG. 8 shows a perspective view of a combination of the embodiment of the application component A, which is also shown in FIG. 7 and which is realized as an electrical contacting device 500 with a pin-shaped contacting part 501 and the embodiment of the cable holder 1 according to FIG. 1.

In addition, the coupling piece 60 and also the contacting part 501 of the contacting device 500 are formed from an electrically conductive material. For the electrical connection of a cable K to the contacting part 501, a section of an electrically conductive wire of the cable protrudes from the cable sheath in the longitudinal direction thereof and lies in the through opening 15 of the holder housing 15, wherein the side wall of the through opening 15 comprises at least one electrical contacting point which is in contact with the coupling piece 60 via an electrical connecting section, for example in the form of a conductor section. In this application, the coupling piece 60 and the contacting part 501 are formed from electrically conductive material. The contacting part 501 is electrically connected to an electrical functional component or an operational component C1. The electrical operating component C1 can be a current connection device.

Also, the electrical operation component C1 may be a control component with which signals supplied from the cable K via the contacting device 500 to the operation component C1 are processed and, for example, displayed with the operation component C1 or, for example, used to control the application component A. In the example shown, in which the application component A is an adjustment device, the signals can be used to adjust the adjustment device by means of the control component.

According to the invention, an actuator system S with an actuator S1 and a holding device 1 is also provided, as shown in FIGS. 7 and 8. The holding device 1 can be realized according to one of the embodiments described herein. The actuator S1 comprises a convexly curved outer surface portion 501a and, in particular, a pin-shaped contacting part 501 with the convexly curved outer surface portion 501a, which is an application component surface portion A1 defined herein. The coupling piece 60 is in contact with the application component surface section A1 in the form of a convexly curved outer surface section 501a in the coupling state.

LIST OF REFERENCE SYMBOLS 1 holding device
10 holder housing
11 first receiving section
12 second receiving section
14 cable-receiving opening
15 through opening
20 connection device
31 lateral opening
32 lateral opening
33 opening
40 adapter part
50 cable-receiving part
60 coupling piece
62 surface section
140 receiving sleeve
225 connecting element
240 adapter-receiving ring
242 second section
325 connecting element
340 adapter-receiving ring
342 second section
360 cylindrical body
362 plane base surface of the cylindrical body 360
500 contacting device
501 contacting part
501a convexly curved outer surface section, in particular cylindrical lateral surface
505 mounting part
507 connecting section
A application component
A1 application component surface section
A2 magnet
A10 coupling part
A11 additional application component
B1 first reference axis
B2 second reference axis
C electrical connection device
C1 electrical operating component
K at least one cable
S actuator system
S1 actuator

The invention claimed is:

1. Holding device for holding at least one cable, comprising the holding device:
    a holder housing, which is formed as hollow body and which comprises a first receiving section and a second receiving section, wherein the first receiving section comprises a cable-receiving opening for receiving at least a section of a cable, which is realized as a through opening of the holder housing and which extends along a first reference axis of the holding device, wherein the first receiving section and the second receiving section are located one behind the other in a second reference axis of the holding device, wherein the second reference axis crosses the first reference axis,
    a connection device with an adapter part which is fixed or fastened to the second receiving section of which is fixed and fastened to the second receiving section and with a coupling piece made of a magnetic material, which is fixed in the adapter part in a positive fitting manner or pressed in the adapter part and which, in a coupling state, couples the holding device to an application component,
    wherein a surface portion of the coupling piece protrudes from the holder housing in direction of the second reference axis and which at least partially forms an outer surface of the holding device, and
    wherein the coupling piece comprises a curved surface portion at least in a section, the orientation of which extends along the second reference axis and which projects away from the cable-receiving opening such that the surface portion of the coupling piece, in the coupling state, is suitable to detachably contact an application component surface portion of an application component and, in the coupling state, to rotatably couple the holder housing relative to the application component at least about the second reference axis.

2. Holding device according to claim 1, wherein the holding device in the coupling state is additionally displaceable along the extension of the application component surface portion, so that the holding device is movable along or transversely or both along and transversely to the first reference axis.

3. The holding device according to claim 1, wherein the holding device is tiltable relative to the application component surface portion in the coupling state.

4. Holding device according to claim 1, wherein the coupling piece is formed at least in a section as a cylindrical body, wherein a planar base surface of the cylindrical body comprises an orientation which is directed in or along the direction of the second reference axis and is directed away from the through opening.

5. Holding device according to claim 1, wherein the adapter part is inserted into an opening of the holder housing, wherein the opening is directed away from the through opening in the direction of the second reference axis, wherein by means of the adapter part the coupling piece is held in the holder housing.

6. Holding device according to claim 5, wherein the adapter part is shaped in such a way that it realizes a positive connection with the coupling piece.

7. Holding device according to claim 1, wherein the cable-receiving opening is designed such that a cable inserted therein can move relative to the holder housing in the first reference axis or can perform a rotation about the first reference axis.

8. Holding device according to claim 1, wherein a cable-receiving part for receiving at least one cable is arranged in the cable-receiving opening of the holder housing.

9. Combination of a holding device according to claim 1 and the application component, wherein in a coupling state the coupling piece abuts against the application component surface portion of the application component, and wherein the coupling piece of the holding device and the application component are attracted by a magnetic attraction force and are coupled.

10. Combination according to claim 9, wherein the application component comprises a concave recess in which the coupling piece is partially located.

11. The combination according to claim 9, wherein the application component surface portion of the application component comprises a convexly curved outer surface.

12. The combination according to claim 11, wherein the application component comprises a pin-shaped portion comprising the convexly curved outer surface, which is the application component surface portion, wherein the pin-shaped portion abuts against which the coupling piece.

13. Combination according to claim 9, wherein the application component is a crimp flange.

14. Electrical connection device for electrically connecting a cable with a holding device according to claim 1 and an application component, which is designed as an electrical contacting device made of an electrically conductive material, wherein the coupling piece is formed from electrically conductive material, wherein, in the coupling state, the coupling piece abuts against the application component surface portion of the application component, and wherein the coupling piece of the holding device and the application component are attracted and coupled by a magnetic attraction force, wherein the coupling piece abuts against an application component surface portion of the electrical contacting device, and wherein the holding device and the application component are attracted and coupled by a magnetic attraction force.

15. Actuator system with an actuator and with a holding device according to claim 1, wherein the actuator comprises a pin-shaped contacting member with a convexly curved outer surface portion which is the application component surface portion, against which the coupling member abuts in the coupling state.

* * * * *